Jan. 19, 1932.  E. E. McCONNELL  1,842,040
LOGGING HOOK
Filed April 19, 1930   2 Sheets-Sheet 1
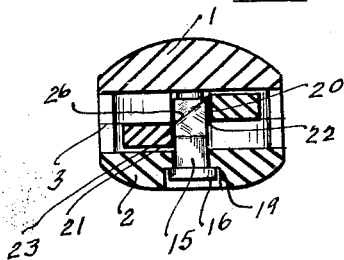
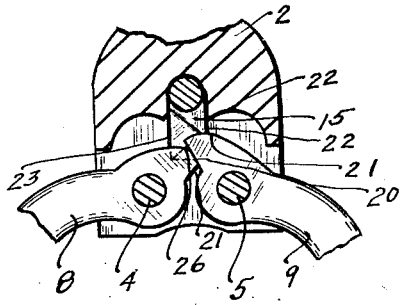
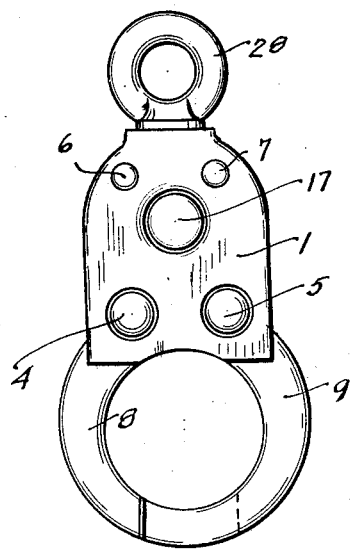
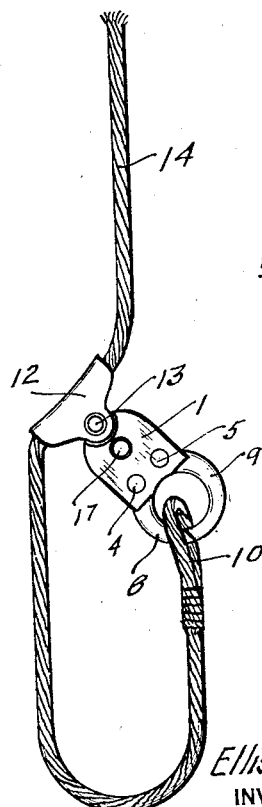
Ellis E. McConnell
INVENTOR
BY Thomas Billyer
ATTORNEY Jan. 19, 1932.  E. E. McCONNELL  1,842,040
LOGGING HOOK
Filed April 19, 1930  2 Sheets-Sheet 2
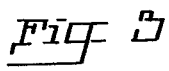
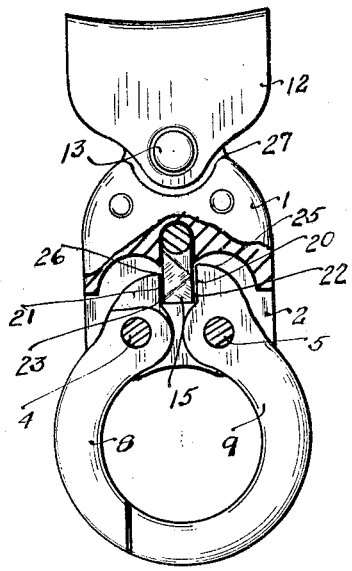
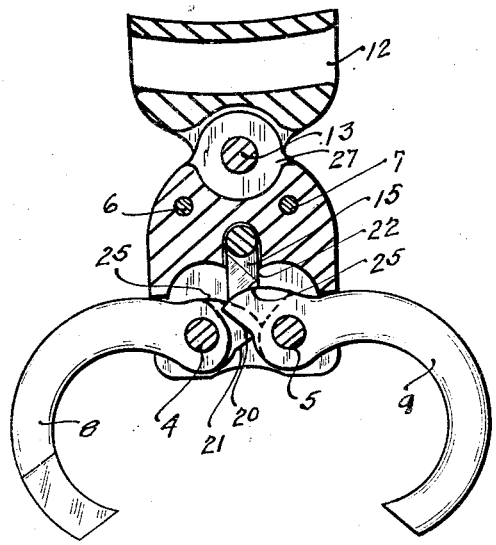
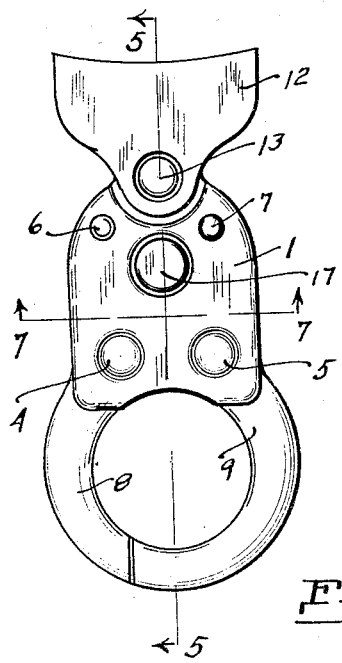
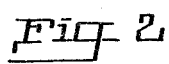
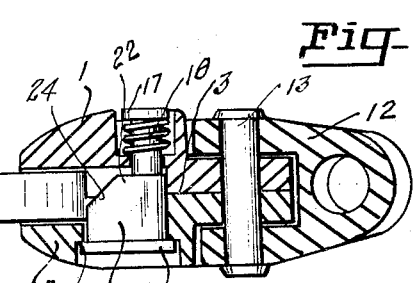
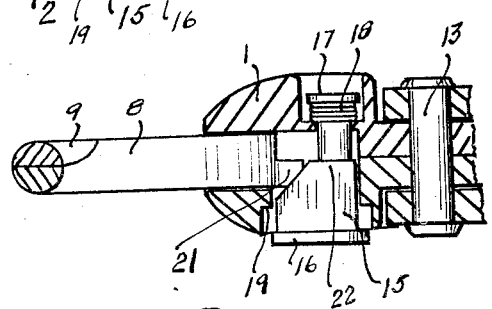
Ellis E. McConnell
INVENTOR
BY Thomas Bilyw
ATTORNEY Patented Jan. 19, 1932

1,842,040

UNITED STATES PATENT OFFICE

ELLIS E. McCONNELL, OF PORTLAND, OREGON

LOGGING HOOK

Application filed April 19, 1930. Serial No. 445,683.

My device is primarily intended for use in conjunction with rigging of all kinds and for use in conjunction with lines and tackle. The device is primarily adapted for use in logging camps; in the handling of ships' rigging and in any and all places where lines, or wire rope, or other flexible lines are being used in the handling of loads that require the release of the line from the hooks and especially where it is desirable to hitch and unhitch the ends of the lines, chokers and other devices that are reeved through hooks and swivels and where it is necessary to detach the line from the hook temporarily for any purpose.

The invention in its preferred embodiment consists of a body element having a pair of hook forming elements hingedly secured about parallelly disposed supporting pins within the body element and having manually manipulative means for unlocking the hooks from their normal position to permit the opening of the same for the placing of lines therein and for the removal of the line therefrom. A reacting element is provided relative to the locking device for normally maintaining the hooks in a closed position. A sleeve is hingedly secured to the body element through which one or more lines may be made to pass.

The primary object of my invention is for the rapid handling of lines, or wire rope, and for the attaching and detaching of the same relative to a pair of hooks hingedly secured to the body element. The body element may be split longitudinally to facilitate the placement of the hook elements therein and the locking device disposed within the body element and which is adapted for being manually manipulated into and out of locking engagement with that of the hook elements.

The primary object of my invention is to provide a device to be used in conjunction with wire rope, or other flexible lines, to form a choker line, one end of which may be quickly detached from engagement with a locking ring composed of two hook forming elements to free one end of the line.

A further object of my invention consists in providing a body element having a pair of hook forming ring elements hingedly secured thereto and having a swiveling head secured to the body element and having manually manipulative means for locking and unlocking the hook forming ring elements relative to the body element.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a side view of the assembled device in preferred embodiment and illustrating a choker line associated therewith.

Fig. 2 is a front elevation of the assembled device.

Fig. 3 is a fragmentary, sectional, side view of the assembled device. In this view the body element is partially broken away to show the ring forming hook elements illustrated in normal closed position.

Fig. 4 is a sectional, front view of the mechanism illustrated in Fig. 3 and illustrating the ring forming hook elements in open position.

Fig. 5 is a longitudinal, sectional, side view of the assembled device the same being taken on line 5—5 of Fig. 2, looking in the direction indicated.

Fig. 6 is a fragmentary, sectional, side view of the assembled device, the same being made to illustrate the hand manipulative locking device in position to permit the movement of the hook forming elements.

Fig. 7 is a sectional, end view of the assembled device, the same being taken on line 7—7 of Fig. 2 looking in the direction indicated.

Fig. 8 is a fragmentary, sectional, side view of the body element, the locking device for locking the ring forming hook elements, and illustrating the locking device as being manipulated to permit the movement of the ring forming hook elements.

Fig. 9 is a front elevation of the device, in modified form, illustrating a swivel eye formed in one end of the body element instead of the sleeve as illustrated in the other views.

Like reference characters refer to like parts throughout the several views.

In preferred embodiment, I form the body element of my device of sections 1 and 2, split on their media lines 3 to form body elements uniform in thickness and dimension. Parallelly disposed pins, 4 and 5, pass through the side walls of the body element and are fixedly positioned within the body element and maintain the side walls of the body element together. Additional fastening pins, 6 and 7, may be used in the larger sizes for maintaining the body element together. Ring forming hooks 8 and 9 are hingedly disposed about the parallelly disposed pins, 4 and 5. The hook forming elements 8 and 9, when closed, as illustrated in Figs. 2 and 3, form a complete ring through which the loop end 10 of choker 11 may be made to pass. A sleeve 12 is hingedly secured about a pin 13 running through the body element. The sleeve 12 is intended for the passing of the line 14 therethrough to form a choker 11. A hand manipulative locking element 15 passes through the body element. A head 16 is disposed upon one end of the locking element for limiting the movement of the locking element in one direction relative to the body element and a head 17 is disposed upon the oppositely disposed end of the locking element. A compressible element, as a coil spring 18, is disposed about the locking element and normally maintains the locking element with the under side of the head 16 resting upon a shoulder 19. The normal position of the locking element maintains the ring forming hook elements in the position as illustrated in Figs. 2 and 3. Locking shoulders 20 and 21 are disposed upon the inner end of the ring forming hook elements and when the locking element 15, is in normal position, the shoulders 20 and 21 rest upon the surfaces 22 and 23 of the locking element and maintain the same in compression with a double shearing action being exerted upon the parallelly disposed pins 4 and 5. A sloping surface 24 is provided along one edge of the locking element against which the point 25 of the hook 9 engages. The point 25 of the hook 9 and the point 26 of the hook 8 are of different lengths in order that when the locking element is actuated sufficiently to permit the point 25 of the hook 9 to engage the sloping surface 24 the locking element may be actuated out of locking engagement through the manipulation of the hook 9 and to thereby facilitate the opening and closing of the ring forming hook elements. A half of each of the points of the ring forming hook elements are removed to permit the passing of one over the other. The inner end of the sleeve 12 is formed into a yoke for passing over the outer ends 27 of the body element with the pin 13 passing therethrough.

It may be found desirable in certain classes of construction to put a swiveling eye 28 upon the outer end of the body element as illustrated in Fig. 9. When so made the swiveling eye 28 is substituted for the sleeve 12.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. A choker hook comprising a pair of side wall members attached to each other, a pair of jaws hingedly disposed between the side wall members and adapted to coact with each other, locking shoulders disposed upon the inner ends of the jaws, a locking element disposed through the side wall members and adapted to coact with the locking shoulders, and a compressible element disposed about the locking element for maintaining the element in normal locked position, said locking and unlocking arrangement adapted to permit the unlocking of the hook when in taut position.

2. A choker hook comprising side wall members secured together, jaws rockably disposed between said members, shoulders disposed upon the inner ends of the jaws, a locking pin disposed through the side wall members, said locking pin having a head disposed upon its oppositely disposed ends, and a wedge disposed upon its surface adapted to coact with the shoulders of the jaws, and a spring disposed about the locking pin adapted to maintain the pin in normal locked position.

ELLIS E. McCONNELL.